United States Patent [19]

Lukas et al.

[11] Patent Number: 4,796,975

[45] Date of Patent: Jan. 10, 1989

[54] METHOD OF ALIGNING AND ATTACHING OPTICAL FIBERS TO SUBSTRATE OPTICAL WAVEGUIDES AND SUBSTRATE OPTICAL WAVEGUIDE HAVING FIBERS ATTACHED THERETO

[75] Inventors: Gregory J. Lukas, Lisle; Kevin L. Sweeney, Wheaton; Michael R. Keur, Niles, all of

[73] Assignee: Amphenol Corporation, Wallingford, Conn.

[21] Appl. No.: 50,254

[22] Filed: May 14, 1987

[51] Int. Cl.$^4$ ............... G02B 6/00; B65H 69/02
[52] U.S. Cl. ................... 350/320; 350/96.11; 350/96.17; 350/96.20; 350/96.21; 437/225; 437/228; 437/250; 156/60; 156/158; 156/104
[58] Field of Search ............ 350/96.10, 96.11, 96.12, 350/96.15, 96.16, 96.17, 96.20, 96.21, 96.22, 96.29, 96.30, 320; 437/225, 228, 924, 250; 156/60, 62.4, 73.2, 99, 104, 158, 305

[56] References Cited

U.S. PATENT DOCUMENTS

| | | | |
|---|---|---|---|
| 3,837,827 | 9/1974 | Carruthers et al. | 350/96.19 X |
| 4,046,454 | 9/1977 | Pugh, III | 350/96.21 |
| 4,146,301 | 3/1979 | Cherin et al. | 350/96.21 |
| 4,240,849 | 12/1980 | Kurokawa et al. | 156/73.2 |
| 4,284,663 | 8/1981 | Carruthers et al. | 350/96.30 X |
| 4,439,265 | 3/1984 | Alferness et al. | 350/96.12 X |
| 4,466,696 | 8/1984 | Carney | 350/96.20 |
| 4,639,074 | 1/1987 | Murphy | 350/96.20 X |
| 4,647,147 | 3/1987 | Pikulski et al. | 350/96.17 |
| 4,657,341 | 4/1987 | Sammueller | 350/96.22 |
| 4,662,962 | 5/1987 | Malavieille | 156/158 |
| 4,720,161 | 1/1988 | Malavieille | 350/96.15 |
| 4,727,649 | 3/1988 | Nishizawa | 350/96.20 X |
| 4,741,796 | 5/1988 | Althaus et al. | 350/96.17 X |
| 4,744,619 | 5/1988 | Cameron | 350/96.17 |
| 4,755,017 | 7/1988 | Kapany | 350/320 X |

FOREIGN PATENT DOCUMENTS

| | | | |
|---|---|---|---|
| 57-85015 | 5/1982 | Japan | 350/96.20 |
| 58-25611 | 2/1983 | Japan | 350/96.20 |
| WO86/02172 | 4/1986 | PCT Int'l Appl. | 350/96.21 |

OTHER PUBLICATIONS

Bulmer et al., "High-Efficiency Flip-Chip . . . Waveguides" Appl. Phys. Lett., vol. 37, No. 4, 8/80, pp. 351-353.

Primary Examiner—William L. Sikes
Assistant Examiner—Brian M. Healy
Attorney, Agent, or Firm—Bacon & Thomas

[57] ABSTRACT

A method of aligning and attaching optical fibers to substrate optical waveguides is disclosed. In accordance with the method, one or more slabs of preferentially etchable material and a waveguide substrate are placed adjacent each other face down on a flat surface for aligning the tops of the slabs with the top of the waveguide. A backing plate is secured to the back surface to hold the entire assembly together. The preferentially etchable material is thereafter etched to form v-grooves in alignment with the light guiding region of the waveguide substrate. Thereafter, optical fibers are secured thereto in an optically aligned manner with the light guiding region. In another aspect, the invention is directed to a fiber pigtailed waveguide substrate manufactured in accordance with the method.

10 Claims, 2 Drawing Sheets

METHOD OF ALIGNING AND ATTACHING OPTICAL FIBERS TO SUBSTRATE OPTICAL WAVEGUIDES AND SUBSTRATE OPTICAL WAVEGUIDE HAVING FIBERS ATTACHED THERETO

BACKGROUND OF THE INVENTION

This invention relates to substrate optical waveguides, and more specifically, to a substrate optical waveguide having fibers pigtailed thereto, as well as to the method of pigtailing or attaching the fibers thereto.

More generally, the invention relates to the attaching of such optical fibers to optical waveguide substrates of the type relating to lithium niobate ($LiNbO_3$) technology or alternatively, lithium tantalate ($LiTaO_3$) technology, and devices employing said technology which are manufactured as integrated optical circuit components such as phase modulators.

As is well known from U.S. Pat. No. 4,439,265, operation of integrated optic devices relies in part on the fact that electromagnetic radiation, i.e., optical or infrared radiation can propegrate through and be contained by layers of transparent materials. Such materials include lithium niobate ($LiNbO_3$) and lithium tantalate ($LiTaO_3$). As disclosed in the referenced U.S. patent, the materials crystallize in a so-called trigonal crystal system which has a threefold symmetry axis, conventionally identified as the z-axis or direction. The basal plane, i.e. the plane normal to the Z-direction, contains the unique x and y directions, arranged at right angles to each other. For the sake of simplicity, since propagation is preferably the same along either the x or y axis, reference will be made to only the y axis, it being understood that the same applies to the x-axis.

As a rule, optical radiation entering a crystal divides into two rays, called the ordinary ray and the extraordinary ray. The rays have polarization vectors at right angles to each other and in general, have different phase velocities implying the existence of two refractive indices in such crystals, which are termed in the ordinary refractive index $n_0$ the extraordinary index $n_e$.

Typically, the waveguides employed in integrated optics are typically a channel waveguide, more typically a thin narrow region having somewhat higher refractive index than the surrounding medium, with typical transverse dimensions of one to several micrometers of the radiation. The last requirement translates into typical transverse dimensions of integrated optics channel waveguides of one to several micrometers. Such guiding structures are produced by lithographic techniques akin to those used in integrated circuit technology.

Typical of methods employed for producing a light waveguide in substrate materials, in addition to the above-referenced U.S. patent, are the methods also disclosed in U.S. Pat. Nos. 3,837,827 to Caruthers, et al. and 4,284,663 to Caruthers, et al., as well as the most preferred method as disclosed in U.S. application Ser. No. 908,066, filed Sept. 16, 1986, now abandoned, which is commonly assigned. It is these types of devices on which the method in accordance with the invention is practiced because these devices, be they a simple a light guide or an active device such as a phase modulator having electrodes thereon, are useless unless there is a means for transmitting light into and out of the devices.

Accordingly, it becomes necessary to align and attach optical fibers to the end of the waveguide defined in the substrate in a very precisely aligned manner to reduce losses in transmissions between the mediums.

U.S. Pat. No. 4,639,074 teaches a method of aligning a fiber waveguide to a waveguide substrate wherein one or more fibers are held in silicon v-grooves and mated in an overlap fashion with the waveguide substrate such that the plurality of degrees of freedom are automatically aligned. In order to attempt to minimize transmission losses, the silicon substrate is set to overlap the top surface of the waveguide substrate, and since the waveguide defined in the waveguide substrate, is generated by in-diffusion thereinto, precise alignment between fiber and light guiding region is not always possible.

A further disadvantage with this arrangement is that it requires an active alignment along one axis before the fiber array is secured.

SUMMARY OF THE INVENTION

In accordance with the invention, a method is provided for precisely aligning fibers with a waveguide in a waveguide substrate which provides for substantially exact coincidence between the fibers and the waveguide with reduced losses in the transmission of light. This is achieved by wholly passive means as contrasted to prior art active alignment techniques.

In accordance with the method, two slabs of preferentially etchable material and a waveguide substrate are placed face down on a flat surface for aligning the tops of the slabs with the top of the waveguide substrate, and with each of the slabs respectively positioned abutting the ends of the waveguide. The position of the slabs and the waveguide substrate are secured by attaching a backplate support to the bottom of the slabs and waveguide substrate. Thereafter, v-grooves are formed in the top surfaces of the silicon slabs in a manner wherein the v-grooves are preferably aligned coextensively with the waveguide on the waveguide substrate. In this regard, it is noted that in the event of silicon slabs being employed, conventional photolithographic techniques can be used and the v-groove creation will be self limiting such that once the desired size is achieved, the etching will stop itself as is well known to those of ordinary skill in this art. Alignment of optical fibers to waveguides is therefore determined by photolithography alignment and proper choice of groove width.

In a further aspect, the method also involves securing fibers in the v-grooves in a manner abutting the ends of the waveguide on the waveguide substrate. Still further, as noted previously the v-grooves are formed on silicon by photolithographic processing. The fibers are preferably secured within the v-groove with a conventional adhesive and to insure that the top surfaces of the slabs in the waveguide substrate are maintained level, when a back plate is attached to the slabs and waveguide substrate, potting material is interposed therebetween to assure that the tops of the slabs and waveguide substrate are maintained in substantially the same plane, and serves as an adhesive to hold the assembly together.

As to the waveguide substrate, preferably it is a lithium niobate waveguide substrate having a titanium in-diffused light waveguide region thereon. Prior to attaching the back plate to the waveguide substrate and the silicon slabs, the slabs and substrate are held together positioned by vacuumed suction on the downward facing top surfaces thereof.

In a still further aspect, the invention comprises a substrate waveguide having fibers pigtailed thereto which is manufactured in accordance with the above-described method.

BRIEF DESCRIPTION OF THE DRAWINGS

Having briefly describe the invention, the same will become better understood from the following detailed discussion taken in conjunction with the attached figures wherein.

DETAILED DISCUSSION OF THE INVENTION

Figure 1:
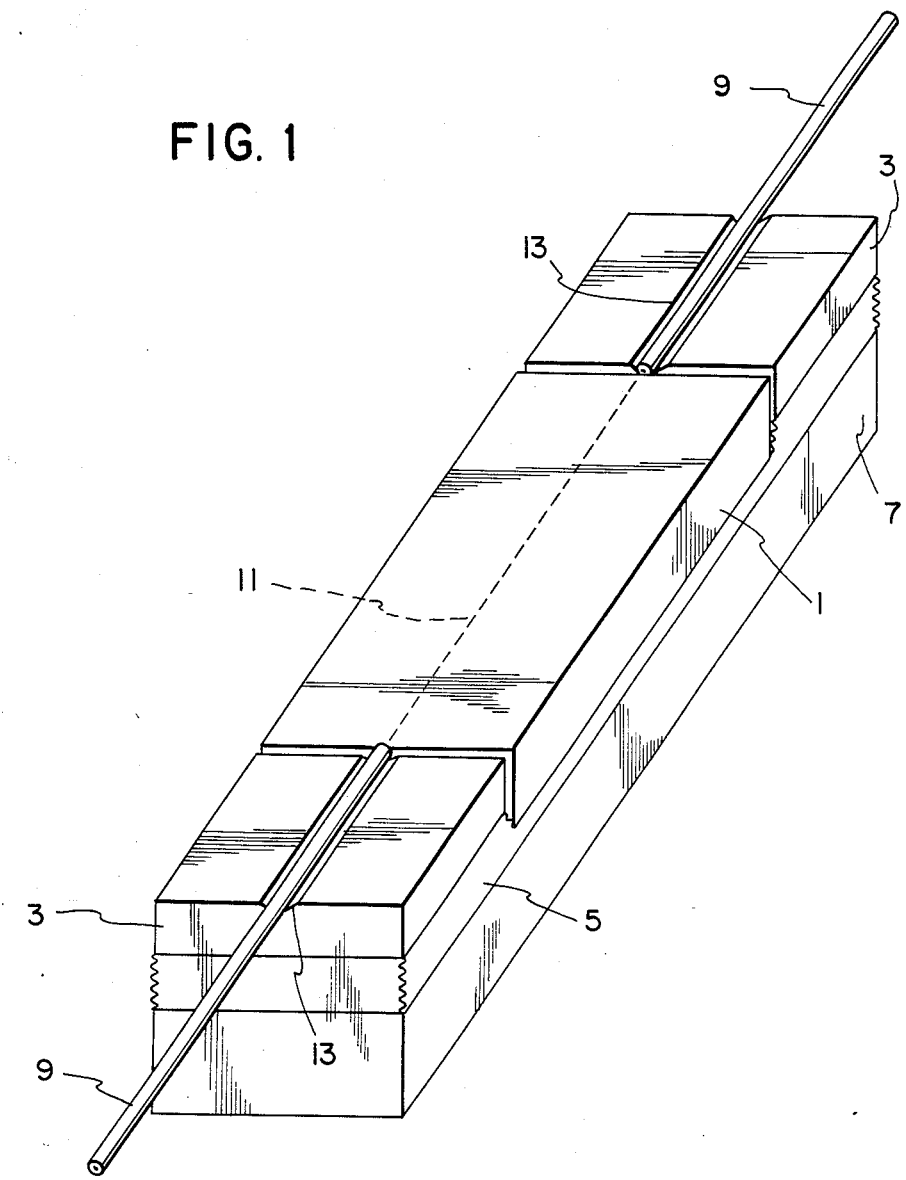
FIG. 1 is a perspective view of a waveguide substrate in accordance with the invention, having silicon slabs attached thereto with fibers secured in alignment with the light guiding path of the substrate.
Figure 2:
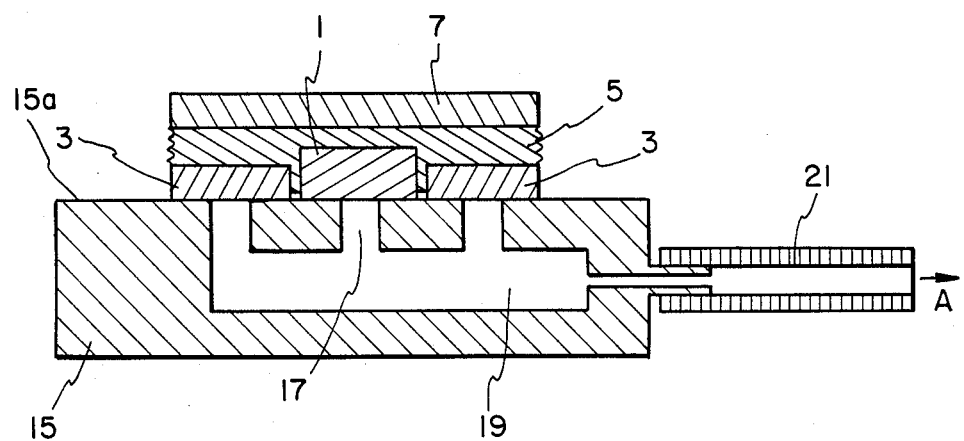
FIG. 2 is a side cross sectional schematic view of the arrangement for assembling the pigtailed waveguide substrate in accordance with the invention.

The device manufactured in accordance with the invention is generally shown in FIG. 1. As is shown therein, the device generally comprises a waveguide substrate 1 having a light guiding region 11 thereon. Typically this waveguide substrate is of a material such as lithium niobate or lithium tantalate having the light guiding region 11 defined, for example, by titanium indiffusion as discussed in the previously referenced patents.

Alternative methods of defining the light guiding region 11 can be employed as will be readily apparent to those of ordinary skill in the art.

As can be seen from FIG. 1, two slabs 3 of etchable material are secured to the ends of the waveguide substrate 1. The etchable material is, for example, silicon. The top surfaces of the slabs 3 and the waveguide substrate 1 are optically aligned and the slabs 3 can be etched to have v-grooves 13 by conventional photolithographic techniques as will be readily apparent to those of ordinary skill in the art.

As well known and conventional, the etching processes on silicon are self-limiting such that the v-grooves will, after reaching a predetermined size, stop growing. With the v-grooves so etched, the device can then has fibers 9 secured in the v-grooves 13 so that the fibers 9 are pigtailed in precise alignment with the light guiding region 11.

In order to maintain the top surfaces of the slabs 3 and the waveguide substrate 1 optically aligned, preferably a backing plate 7 is secured to all three by means of a potting adhesive 5 which can make up for differences in thickness of the slabs 3 relative to the waveguide substrate 1 such that between the backing plate 7 and potting adhesive 5, the top surfaces of the slabs 3 and waveguide substrate 1 can be maintained optically aligned.

In accordance with the method as conducted, preferably a table 15 is provided having a flat top surface 15a. A plurality of openings 17 are on the top surface 15a which open into a plenum chamber 19 which leads into a vacuum line 21 through which a vacuum can be drawn in the direction of arrow A.

In the practice of the invention, the waveguide substrate 1 is placed on the top surface 15a top side down with silicon slabs 3 located on either side of the waveguide substrate 1 abutting the ends of the light guiding region 11. A potting material/adhesive 5 is placed on the back of the slabs 3 and waveguide substrate 1 in a manner such that any differences in dimension and height are compensated for and thereafter a backing plate 7 is placed on the potting material/adhesive 5 to secure entire arrangement together. While this is being performed, vacuum is being drawn through the line 21 to hold the top surfaces of the slabs 3 and waveguide substrate 1 flat. After the potting material 5 is set, the vacuum is released and the assembled components can be turned right side up. Of course as can be appreciated, equivalent mechanical means can be employed in place of the vacuum to perform the hold down function.

Thereafter, a masking of the silicon slabs 3 is performed by conventional photolithographic techniques and v-grooves 13 are formed by etching. After the v-grooves are formed, which v-grooves are optically aligned with the light guiding region 11, fibers 9 are then secured in the v-groove 13, in precise alignment with the light guiding region 11, by conventional adhesive to result in an optical fiber waveguide substrate having fibers pigtailed thereto which when light is transmitted through the device, little or no losses in transmission occurs as a result of the precise alignment between the light guiding region 11 and the optical fibers 9.

Having described the invention in detail, various additional modifications and extensions of this invention will become apparent to those skilled in the art. All such variations and deviations which basically rely on the teachings for which this invention has advanced the art are properly considered to be within the spirit and scope of this invention.

What is claimed is:

1. A method of aligning and attaching optical fibers to substrate optical waveguides, comprising the steps of:
   (a) placing at least one slab of preferentially etchable material and a waveguide substrate face down on an flat surface for aligning the top of the slab with the top of the waveguide substrate and with the slab positioned abutting at least one end of the waveguide on the substrate;
   (b) securing said position of said slab and said waveguide substrate by securing a base plate support to the bottom of said slab and waveguide substrate; and
   (c) forming a groove in the top surfaces of the slab in a manner wherein said groove is aligned coextensive with the waveguide on said waveguide substrate.

2. A method as in claim 1 wherein said at least one slab comprises two slabs, and said method further comprises placing each of the slabs abutting each end of the waveguide on the substrate.

3. A method as in claim 2 further comprising securing fibers in said grooves in a manner abutting the ends of the waveguide on the waveguide substrate.

4. A method as in claim 3 wherein said grooves are formed by photolithographic processing with later etching.

5. A method as in claim 4 further comprising the step of attaching fibers within said grooves in a manner abutting the end of the waveguide to transmit light therethrough 6. A method as in claim 5 wherein said fibers are secured with an adhesive.

7. A method as in claim 2 further comprising as said securing step, attaching said backplate with potting material interposed between the backplate and the slabs and waveguide substrate to ensure that the tops of the slabs and waveguide substrate are maintained in substantially the same plane.

8. A method as in claim 2 wherein said slabs are silicon and said grooves are v-grooves which are etched after having been defined by photolithographic methods.

9. A method as in claim 8 wherein said waveguide substrate is an LiNbO$_3$ waveguide substrate having a Ti in-diffused light waveguide region thereon.

10. A method as in claim 7 further comprising, prior to attaching said backplate, holding said slabs and waveguide substrate in position by vacuum suction on the downward facing top surfaces thereof.

* * * * *